(12) United States Patent
Hammond et al.

(10) Patent No.: US 6,340,513 B1
(45) Date of Patent: Jan. 22, 2002

(54) THROW-IN MAT FOR A VEHICLE FLOOR

(75) Inventors: Steven P. Hammond, Shippensburg; Randy L. Boyd, Newburg, both of PA (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/444,164

(22) Filed: Nov. 22, 1999

(51) Int. Cl.⁷ .............................. B32B 3/02; D05C 5/00
(52) U.S. Cl. ..................... 428/95; 296/97.23; 15/215
(58) Field of Search ................... 428/95; 296/97.23; 15/215; D12/203; D6/585; 180/90.6; 404/36

(56) References Cited

U.S. PATENT DOCUMENTS

| | | | |
|---|---|---|---|
| 212,497 A | * | 2/1879 | Perry |
| 2,546,394 A | * | 3/1951 | Harmon |
| 5,236,241 A | * | 8/1993 | Courrege .................. 296/97.23 |
| 5,358,769 A | * | 10/1994 | Wiley, III .................... 428/95 |

* cited by examiner

Primary Examiner—Cheryl A. Juska
Assistant Examiner—Jenna-Leigh Befumo
(74) Attorney, Agent, or Firm—Brooks & Kushman P.C.

(57) ABSTRACT

A throw-in mat for a vehicle floor includes a primary backing layer having first and second sides with a carpet pile tufted into the first side of the primary backing layer. A thermoplastic back is secured to the second side of the primary backing layer. The thermoplastic back has a base thickness and a contiguous diamond-shaped pattern of grooves formed therein such that the thermoplastic back has a residual thickness adjacent each groove which is less than approximately 50% of the base thickness, thereby preventing curling and bowing problems at extreme temperatures.

22 Claims, 3 Drawing Sheets

THROW-IN MAT FOR A VEHICLE FLOOR

TECHNICAL FIELD

The present invention relates to a throw-in mat for a vehicle floor having a diamond-shaped groove pattern formed in a thermoplastic backing to prevent curling and bowing problems at extreme temperatures.

BACKGROUND ART

Throw-in mats are often provided in vehicles for protecting carpeted vehicle floors. These mats typically include nibs formed on the back of the mat to grip the carpeted floor. The nibs extend from a thermoplastic back which is secured to a primary backing layer, and a carpet pile is tufted (sewn) into the primary backing layer. Alternatively, the primary backing layer and thermoplastic back could be rubber components, but the thermoplastic material has a price and weight advantage over rubber.

However, if the primary backing layer and thermoplastic back comprise different thermoplastic materials or different configurations, then these components may have differing shrinkage rates at different temperatures. Accordingly, at extreme temperatures, the mat may curl or bow as a result of bending forces generated by the different shrinkage rates.

For example, at extremely cold temperatures, such as −30° F., curling or bowing problems may arise if the shrinkage rate of the thermoplastic backing is greater than the shrinkage rate of the primary backing or carpet face material.

Accordingly, it is desirable to provide an improved throw-in mat design in which curling and bowing problems are alleviated at extreme temperatures without increasing the cost of the throw-in mat.

DISCLOSURE OF INVENTION

The present invention overcomes the above-referenced curling and bowing problems associated with the prior art throw-in mats by providing a throw-in mat including a thermoplastic back having a contiguous diamond-shaped pattern of grooves formed therein to prevent such bowing or curling.

More specifically, the present invention provides a throw-in mat for a vehicle floor including a primary backing layer having first and second sides with a carpet pile tufted into the first side of the primary backing layer. A thermoplastic back is secured to the second side of the primary backing layer. The thermoplastic back has a base thickness and a contiguous diamond-shaped pattern of grooves formed therein such that the thermoplastic back has a residual thickness adjacent each groove which is less than approximately 50% of the base thickness, thereby preventing curling and bowing problems at extreme temperatures.

Preferably, the residual thickness is approximately 25% of the base thickness, and the opposing tips of each diamond-shaped pattern have a tip radius of less than approximately 0.04". Also, each groove of the groove pattern is preferably positioned at a groove angle of approximately 25° to 28° with respect to a pile direction of the carpet pile.

Accordingly, an object of the invention is to provide an improved throw-in mat design in which curling and bowing problems are alleviated at extreme temperatures.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

The present invention stems from the realization that by creating thick sections of a thermoplastic back surrounding the nibs, and thin sections set at angular patterns between the nibs, the shrinkage difference between the thermoplastic back and the primary backing layer is absorbed by the thin sections, which eliminates bowing or curling at extreme temperatures.

Figure 1:
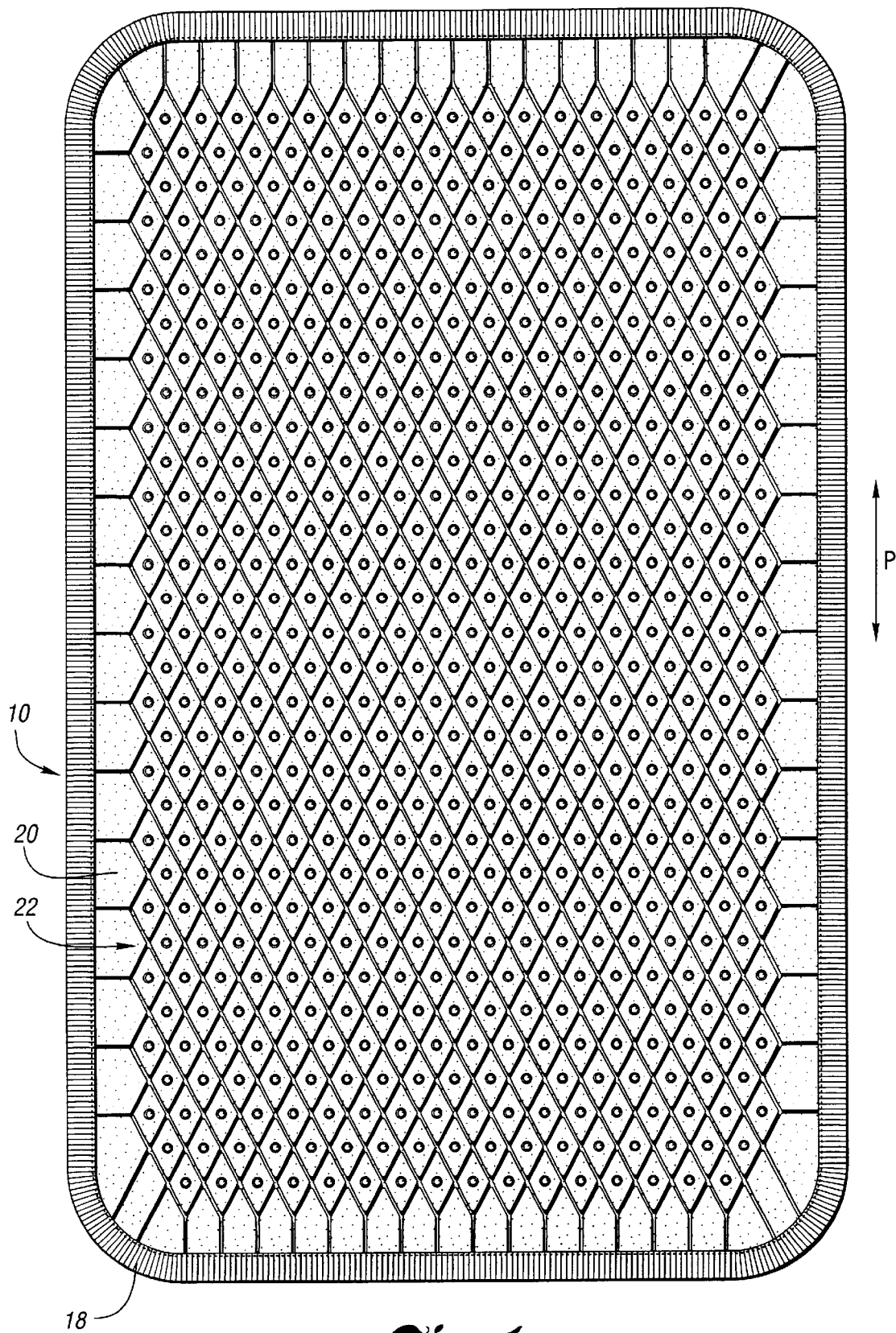
FIG. 1 shows a plan view of an underside of a throw-in mat in accordance with the present invention.
Figure 2:
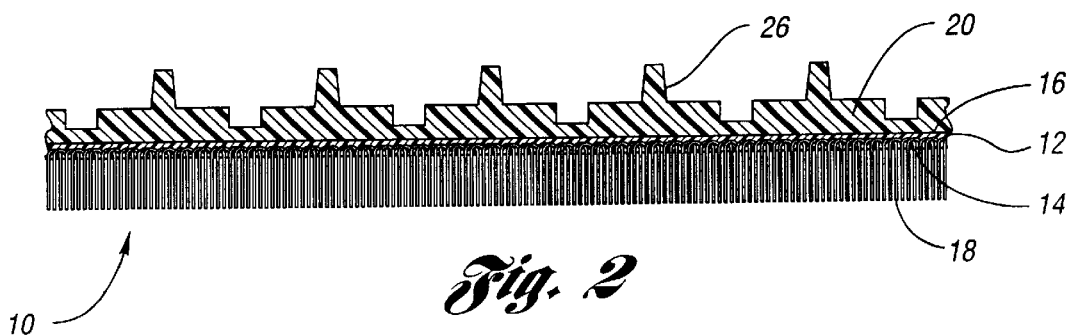
FIG. 2 shows a partial vertical cross-sectional view through the mat of FIG. 1.
Figure 3:
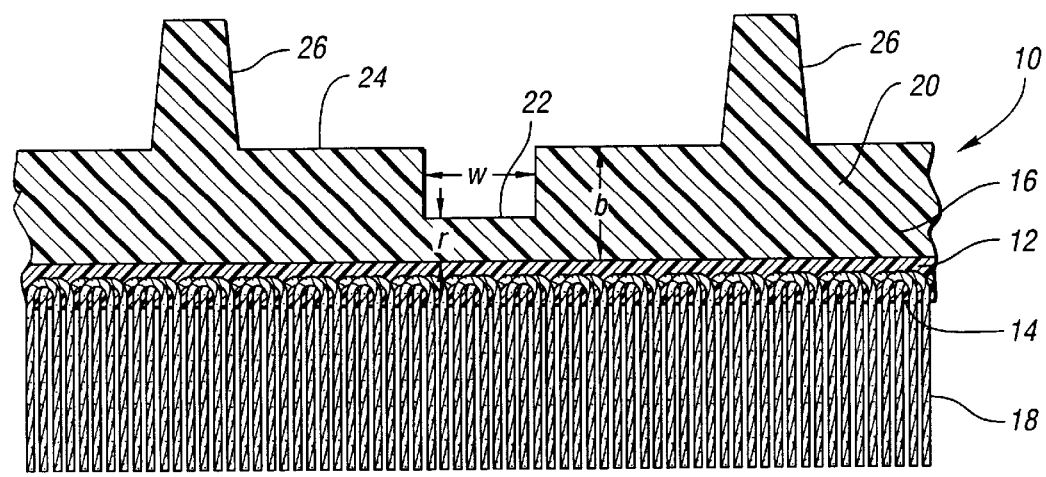
FIG. 3 shows an enlarged partial vertical cross-sectional view of the mat shown in FIG. 2.

Referring to FIGS. 1–3, a throw-in mat 10 is shown in accordance with the present invention. FIG. 1 shows a plan view of the back side of the throw-in mat 10, and FIGS. 2 and 3 show vertical cross-sectional views taken through the mat 10.

As shown, the thermoplastic mat 10 includes a primary backing layer 12 having first and second sides 14,16 thereof. A carpet pile 18 is tufted, or sewn, into the first side 14 of the primary backing layer 12. The primary backing layer 12 is preferably a woven polypropylene or non-woven polyester material.

A thermoplastic back 20 is secured to the second side 16 of the primary backing layer 12. The thermoplastic back is preferably a TPO (thermoplastic polyolefin) material, which provides a weight saving over the use of rubber as a backing material. The thermoplastic back 20 is preferably extruded onto the primary backing layer 12. The thermoplastic back 20 is then heated under pressure, and a contiguous diamond-shaped pattern of grooves 22 is formed on the back surface 24 of the thermoplastic back 20 by a compression molding tool, such as the tool 30 shown in FIGS. 4 and 5. The tool 30 also forms the nubs 26.

As shown in FIG. 3, after formation of the pattern of grooves 22 and nubs 26, the thermoplastic back 20 has a resultant shape including a base thickness (b) and a residual thickness (r) adjacent each groove 22 which is less than approximately 50% of the base thickness (b). Preferably, the residual thickness (r) is approximately 25%, or less, of the base thickness (b).

In the preferred embodiment, the residual thickness is approximately 0.02" and the base thickness is approximately 0.08". It is estimated that the residual thickness (r) could range from about 0.005" to about 0.030", and the base thickness could range from approximately 0.06" to approximately 0.10" for a TPO backing material. Also, preferably the grooves 22 have a width (w) of approximately 0.03", as shown in FIG. 3.

Figure 5:
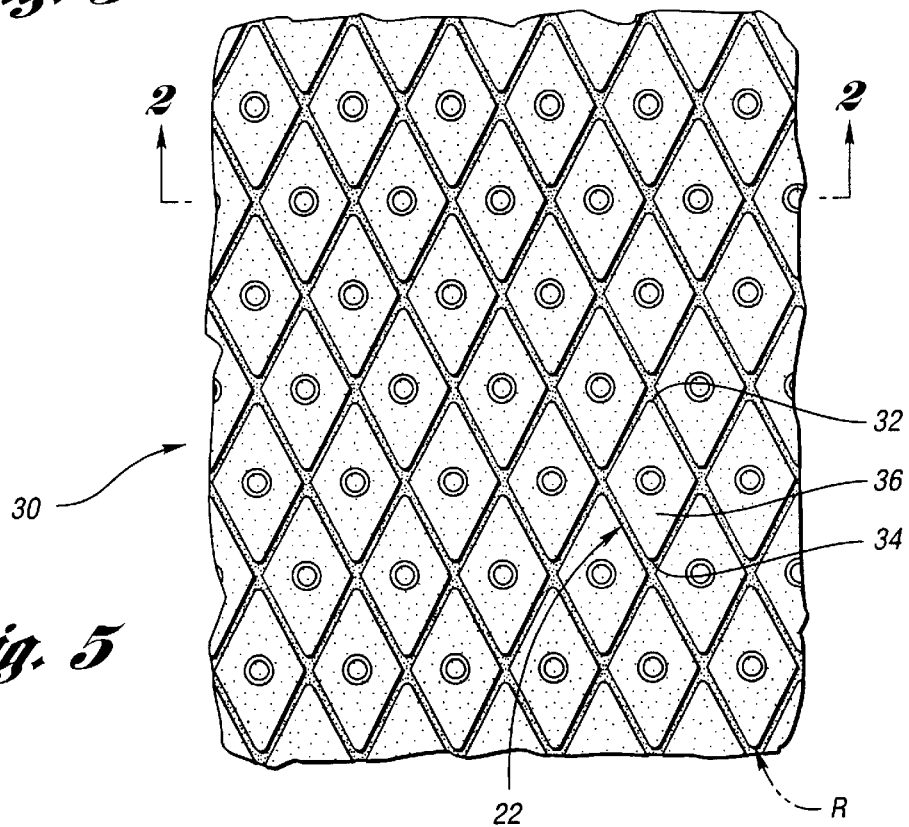
FIG. 5 shows an enlarged partial plan view of the tool of FIG. 4.
Figure 4:
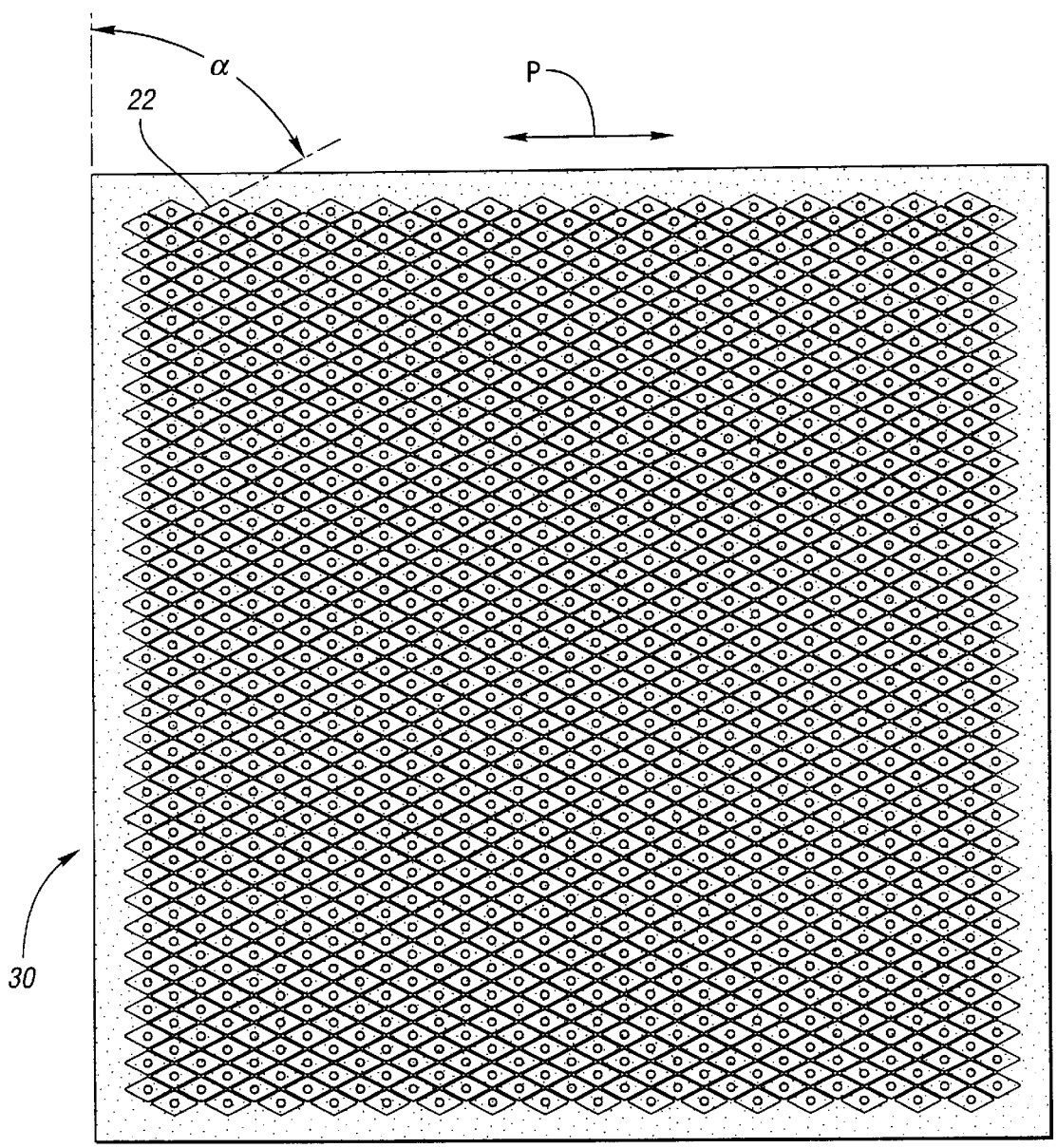
FIG. 4 shows a plan view of a molding tool used for forming the grid pattern and nubs on the thermoplastic back of the mat of FIG. 1.

Turning to FIGS. 4 and 5, the opposing tips 32,34 of each diamond 36 formed by the groove pattern 22 have a tip radius (R) of approximately 0.031", and preferably less than approximately 0.040". This radial dimension (R) is preferably as small as possible, while allowing the face of the tool 30 to be properly machined. It has been determined through experimentation that a mat having diamond tip radii (R) larger than approximately 0.05" tend to curl or bow at extreme temperatures, therefore sharpness of the opposing tips 32,34 of each diamond 36 is an important feature of the invention.

As shown in FIG. 4, each of the grooves 22 forms an angle α of preferably 63 degrees, 26 minutes with respect to a lateral direction of the mat, i.e., 26 degrees, 34 minutes with respect to the pile direction P of the carpet pile 18. This groove angle α may vary from approximately 62° to approximately 65° with respect to the lateral direction of the mat, or 25° to 28° with respect to the pile direction P.

The above described groove pattern 22 tends to reduce the shrinking tendency and dissipate forces generated by the shrinking large thermoplastic back 20. At the time of filing of the present application, it is not clear why the diamond pattern is the only pattern which works. The inventors have experimented with square and circular patterns unsuccessfully.

The above-described design appears to be effective in the temperature range of −20° C. to +70° C.

While the best mode for carrying out the invention has been described in detail, those familiar with the art to which this invention relates will recognize various alternative designs and embodiments for practicing the invention within the scope of the appended claims.

What is claimed is:

1. A throw-in mat for a vehicle floor comprising:
    a primary backing layer having first and second sides;
    a carpet pile secured to the first side of the primary backing layer;
    a thermoplastic back secured to the second side of the primary backing layer, said thermoplastic back having a base thickness and a contiguous diamond-shaped pattern of grooves formed therein such that the thermoplastic back has a residual thickness at each said groove which is less than approximately 50% of said base thickness, thereby preventing curling and bowing problems at extreme temperatures.

2. The throw-in mat of claim 1, wherein said residual thickness is approximately 25% of said base thickness.

3. The throw-in mat of claim 2, wherein said residual thickness is approximately 0.02" and said base thickness is approximately 0.08".

4. The throw-in mat of claim 1, wherein said residual thickness is approximately 0.005" to 0.030" and said base thickness is approximately 0.06" to 0.10".

5. The throw-in mat of claim 1, further comprising a plurality of nibs protruding from the thermoplastic back.

6. The throw-in mat of claim 1, wherein each of said grooves is approximately 0.03" wide.

7. The throw-in mat of claim 1, wherein said thermoplastic back comprises a thermoplastic polyolefin.

8. The throw-in mat of claim 7, wherein said primary backing layer comprises woven polypropylene.

9. The throw-in mat of claim 7, wherein said primary backing layer comprises non-woven polyester.

10. The throw-in mat of claim 1, wherein each diamond formed by said diamond-shaped pattern of grooves comprises opposing tips having a tip radius of less than approximately 0.040".

11. The throw-in mat of claim 10, wherein each said tip radius is approximately 0.031".

12. The throw-in mat of claim 1, wherein each groove of said groove pattern is positioned at a groove angle of approximately 25° to 28° with respect to a pile direction of the carpet pile.

13. The throw-in mat of claim 12, wherein each said groove angle is approximately 26 degrees, 34 minutes.

14. The throw-in mat of claim 1, wherein said thermoplastic back is extruded onto the primary backing layer.

15. A throw-in mat for a vehicle floor comprising:
    a primary backing layer having first and second sides;
    a carpet pile tufted into the first side of the primary backing layer;
    a thermoplastic back secured to the second side of the primary backing layer, said thermoplastic back having a base thickness and a contiguous diamond-shaped pattern of grooves formed therein such that the thermoplastic back has a residual thickness at each said groove which is approximately 25% of said base thickness, thereby preventing curling and bowing problems at extreme temperatures.

16. The throw-in mat of claim 15, wherein said residual thickness is approximately 0.02" and said base thickness is approximately 0.08".

17. The throw-in mat of claim 15, wherein said residual thickness is approximately 0.005" to 0.030" and said base thickness is approximately 0.06" to 0.10".

18. The throw-in mat of claim 15, further comprising a plurality of nibs protruding from the thermoplastic back.

19. A throw-in mat for a vehicle floor comprising:
    a primary backing layer having first and second sides;
    a carpet pile attached to the first side of the primary backing layer;
    a thermoplastic back secured to the second side of the primary backing layer, said thermoplastic back having a base thickness and a contiguous diamond-shaped pattern of grooves formed therein such that the thermoplastic back has a residual thickness at each said groove which is less than approximately 50% of said base thickness, thereby preventing curling and bowing problems at extreme temperatures; and
    wherein each diamond formed by said diamond-shaped pattern of grooves comprises opposing tips having a tip radius of less than approximately 0.040".

20. The throw-in mat of claim 19, wherein each said tip radius is approximately 0.031".

21. The throw-in mat of claim 19, wherein each groove of said groove pattern is positioned at a groove angle of approximately 25° to 28° with respect to a pile direction of the carpet pile.

22. The throw-in mat of claim 21, wherein each said groove angle is approximately 26 degrees, 34 minutes.

* * * * *